Feb. 27, 1951          C. G. MUENCH          2,543,251
GRANULE DEPOSITING METHOD AND APPARATUS
Filed Dec. 17, 1947          3 Sheets—Sheet 1
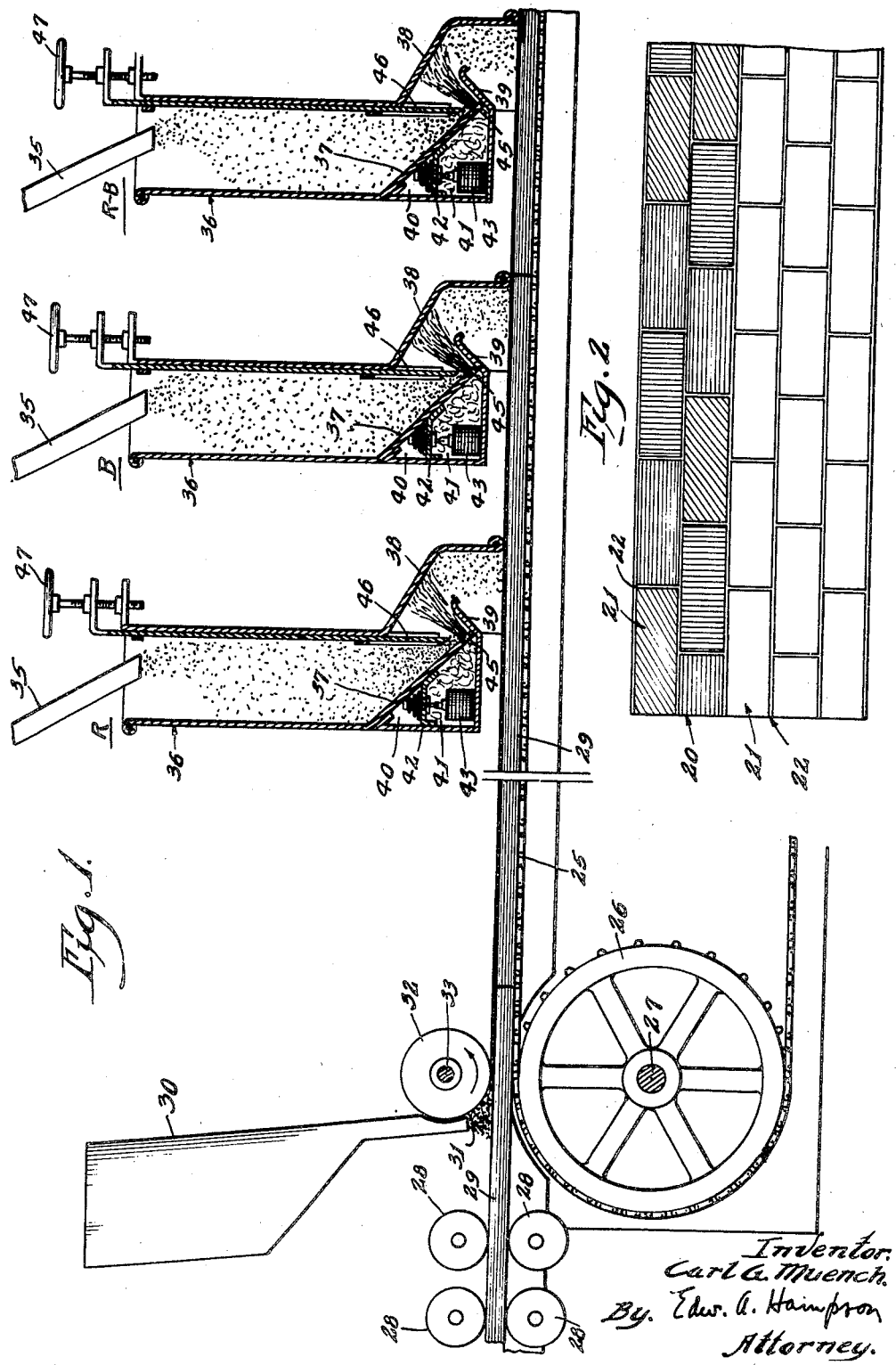

Feb. 27, 1951     C. G. MUENCH     2,543,251
GRANULE DEPOSITING METHOD AND APPARATUS
Filed Dec. 17, 1947     3 Sheets-Sheet 2
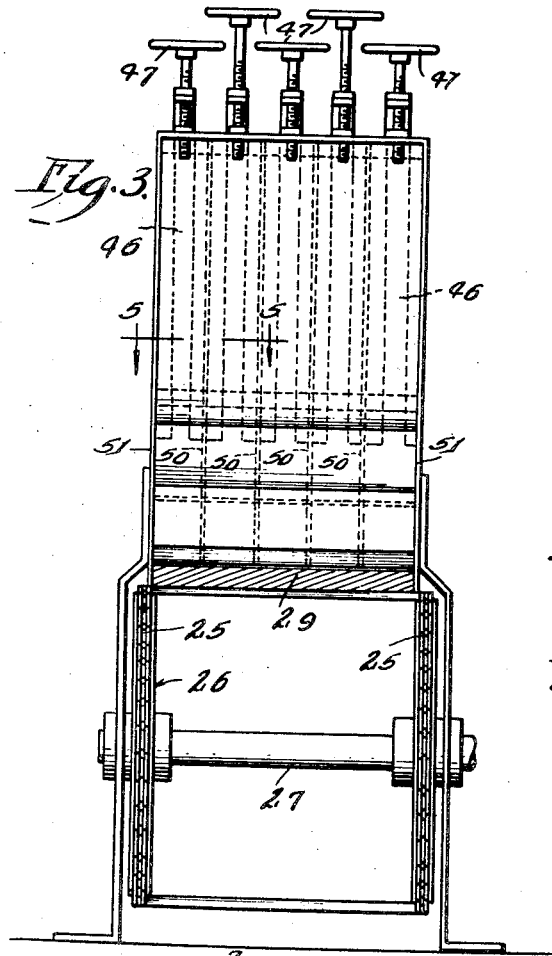
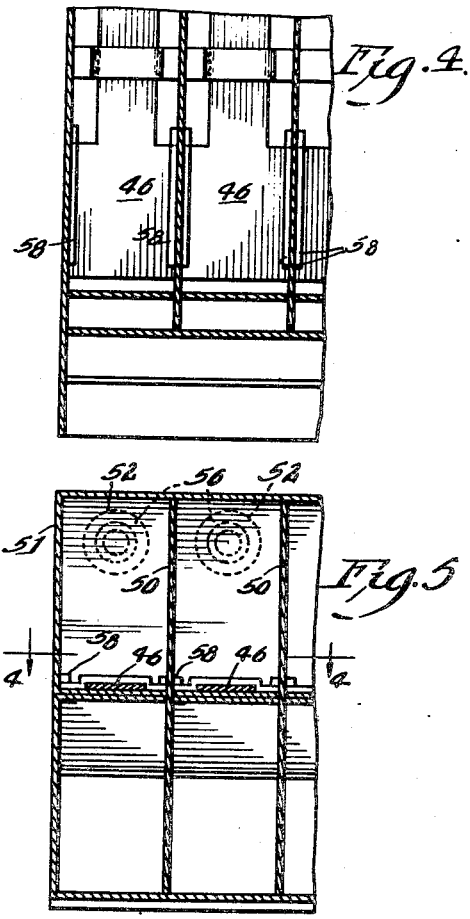
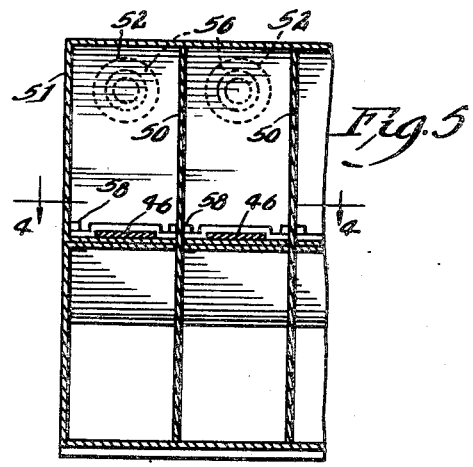
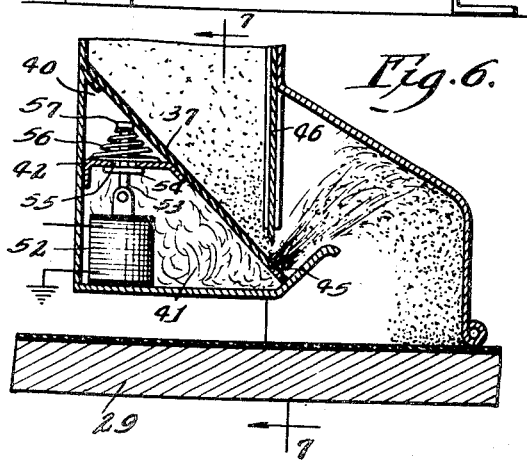
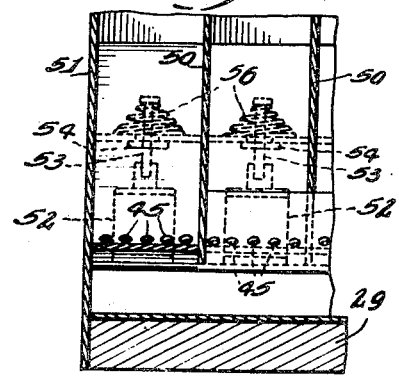
Inventor.
Carl G. Muench.
By Edw. A. Hampson
Attorney.

Inventor:
Carl G. Muench.
By Edw. A. Hampson
Attorney.

Patented Feb. 27, 1951

2,543,251

UNITED STATES PATENT OFFICE 2,543,251

GRANULE DEPOSITING METHOD AND APPARATUS

Carl G. Muench, Glenview, Ill., assignor to The Celotex Corporation, Chicago, Ill., a corporation of Delaware Application December 17, 1947, Serial No. 792,308

8 Claims. (Cl. 117—25)

This invention relates to a device for manufacturing insulating brick siding units, or the like, having a variegated pattern application of surfacing material. The particular disclosure in connection with which the invention will be described is that of a device for the manufacture of insulating brick siding. The device as illustrated and as it will be described is for the production of insulating brick siding units having what is ordinarily referred to as a "variegated pattern." That is, various of the brick simulating elements comprising the surface of the product are surfaced with granules of different colors so that the product simulates brick work laid with bricks of different colors.

It is particularly the object of this invention to provide a device for the manufacture of insulating brick siding units having a variegated surface pattern. It is further an object of this invention to provide a device, such as referred to, wherein the surfacing material, generally of granular form, is applied in the manufacture of the sheet without the necessity of using a mechanical feeder, that is, the surfacing materials are applied by utilizing air and gravity as the forces for moving the granules and applying them to the surface. It is also an object of this invention to provide a device, as above referred to, wherein provision is made for varying the pattern of the applied surfacing material together with means for varying the application of the variegated pattern, that is, for moving the pattern either forwardly or back with respect to the surface to which is is being applied.

Whereas the attainment of the foregoing objectives of this invention are disclosed and will be described particularly with reference to the manufacture of an insulating brick siding product, it is to be understood that the principles disclosed are of general application and may be availed of in connection with the manufacture of a stone simulating siding material, strip roofing or siding, shingles and the like.

The inventions hereof are disclosed in the accompanying drawings, wherein Figure 1 is in the nature of a diagrammatic elevation of the device with parts shown in section;

Figure 2 is a plan view of a patterned insulating brick siding unit;

Figure 3 is an end view of the device, in elevation;

Figure 4 is a view taken on line 4—4 of Figure 5;

Figure 5 is a fragmentary section taken on line 5—5 of Figure 3;

Figure 6 is a sectional detail of the lower end of a hopper unit on a somewhat enlarged scale;

Figure 7 is a section taken on line 7—7 of Figure 6;

Figure 8:
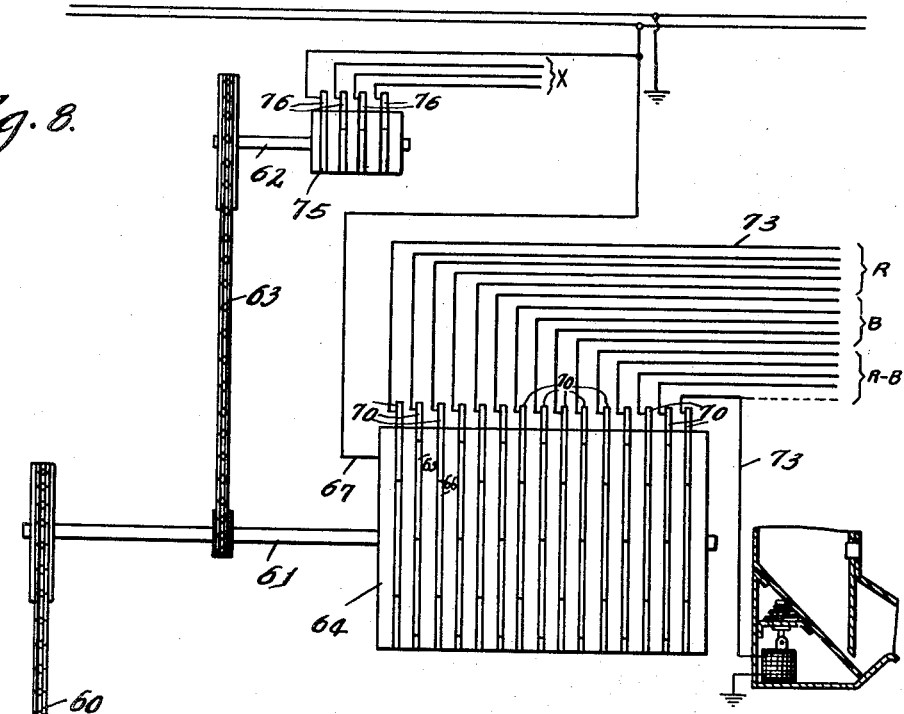
Figure 8 is a diagrammatic view showing the electrical connections and illustrating the program selectors.
Figure 10:
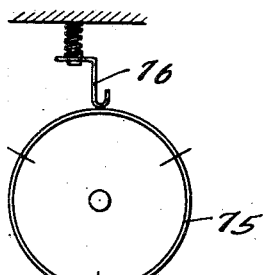
Figure 10 is a diagrammatic showing of the pattern shifting selector.

In the drawings, a patterned brick siding unit is illustrated and identified by numeral 20. The surface of the unit 20 has a pattern simulating brick work with individual bricks 21 and mortar lines 22. The brick simulation is obtained by coating the surface of a base sheet with asphalt on which is deposited and adhered a surfacing of granules of such color and character that the surface simulates brick. In general, the entire surface of the base material is coated with asphalt and the surfacing granules are applied over the entire asphalt coating, and subsequently the mortar lines are provided by pressing the surface of the sheet with a heated patterned member which, along the mortar lines, presses the surfacing granules completely into the asphalt coating along such mortar lines, so that the mortar lines appear between the individual brick elements as black, depressed mortar lines. In some cases, if the surfacing granules are submerged in the asphalt coating, as has just been described, a contrasting granule is applied along the mortar joint lines, preferably a white or light-colored fine granule, which is suitably pressed into the coating so that it adheres but is not submerged.

The device for manufacturing the insulating brick siding units, which device is generally illustrated in Figure 1 of the drawings, comprises a conveyor on which the base material is carried in a substantially horizontal path, above which conveyor are suitably provided means for applying a coating of asphalt to the upper face of the blanks and then provides for applying the granules to such coating with subsequent processing to suitably adhere the granules and press into the surface the desired mortar line pattern. In the drawings the device is illustrated only with respect to that portion for applying the surface coating and applying the granules to such surface coating, the remainder of the device being preferably in accordance with the usual construction of such machines and the disclosure thereof being immaterial to the inventions hereof.

In a suitable supporting frame there is provided a conveyor 25 which runs over suitable supporting and driving rolls, one of which is shown at 26, this conveyor roll 26 being mounted on shaft 27.

Base material for the insulating brick siding product hereof, in such case sheets of fiber insulation board 29, is placed on conveyor 25, the feeding of such insulating board blanks 29 being illustrated as by means of feed rolls 28 which supply the blanks to conveyor 25. The blanks are fed preferably in butted relation to conveyor 25, and consequently, in effect, present an endless surface under the coating and granule-applying devices which are mounted over conveyor 25.

There is provided an asphalt supply tank 30 which, at its lower end, at 31, discharges a stream of molten asphalt onto the surface of the fiber board blanks as they pass under the asphalt discharge spout 31. Immediately following the point of application of the molten asphalt there is provided a roll 32 mounted on shaft 33 which spreads the molten asphalt over the surface of the blank and limits the thickness of the asphalt coating, since it acts in the nature of a doctor.

Positioned also over the conveyor 25, and sufficiently far ahead of the doctor roll 32 so that the asphalt coatings will have cooled to the proper consistency, there are provided granule depositing means which are of such construction and operation that a variegated pattern may be applied to the asphalt coating on blanks 29.

Considering a granule supply hopper, as such is shown in Figure 1, it will be seen that such comprises merely a hopper or bin to which the granular material for surfacing may be supplied from supply chute 35. Actually, granule hopper 36 may be of substantially any desired width, considered lengthwise of the device, but due to limitations which will herein appear elsewhere, transversely of the device, hopper 36 is limited to a width of an individual brick element as such is applied to the base sheet. At its lower end, hopper 36 is provided with a forwardly and downwardly inclined bottom portion 37, and the front wall is directed outwardly and downwardly, as at 38, to provide a downwardly directed discharge nozzle. At the lower end of the downwardly inclined hopper bottom 37 there is an upwardly and forwardly inclined lip 39 which comprises a granule stop, as will be hereinafter more fully described. Under the inclined hopper bottom there is provided an air supply conduit or duct 40 which connects with an air chest 41 through an opening in partition wall 42, which opening is controlled by a solenoid operating valve generally indicated at 43.

In the inclined hopper bottom 37, at its lower end, there are provided small openings 45 which open from the air chest 41 to the nozzle portion 38. Also shown as mounted on the front wall of the hopper 36, there is provided an adjustable gate member 46 which may be adjusted up and down by means of hand wheel 47.

In the drawings the hopper assembly, such as has just been described, is shown as duplicated in three positions, spaced slightly ahead, each forwardly from the one preceding. Each of these hopper assemblies is similar, and therefore for an understanding of the invention it is deemed ample to describe the construction of but one of such hopper assemblies, but it is to be understood that there may be provided one, two, three or any other number of such hopper assemblies, depending upon the degree of variation which it is desired to obtain in the pattern which is to be applied by the device hereof. The present description will deal only with a pattern containing three variations, that is, elements will be red, buff and variegated, which last is a suitable combination of red and buff. If it is desired, for example, to also apply blue, white and black granules, then it is to be understood that it would be necessary to provide on ahead of the three granule hopper units, as shown, three additional granule hopper units to take care of the additional colors. For a somewhat more detailed description of the granule hopper assemblies, and referring to the more detailed disclosures of Figures 3 to 7, it will be seen that each hopper 36, illustrated in Figure 1, comprises one of a group of similar hoppers arranged across the width of the device. In this particular instance, since the pattern to be applied is five units wide, that is five brick rows in width, a hopper assembly comprises five granule hoppers 36 arranged side by side across the width of the device. It is to be understood, of course, that these five hoppers may be provided in a single construction, that is, it may be merely a single wide hopper which is divided into five equal parts by means of suitable partitions 50, which partitions, as well as the side walls 51 of the hopper assembly, are extended downwardly so that they just barely clear the product as it is being carried along on conveyor 25. The solenoid operated valve unit, which was referred to by numeral 43, comprises a solenoid 52, to the plunger of which there is connected a valve stem 53 carrying a valve 54 which controls an opening 55 in partition 42. The valve is biased to a closed position by spring 56 mounted around valve stem 53 and between a stop 57 on the end of valve stem 53 and partition wall 42. Suitable electrical connections are made to the solenoid for energizing it, and upon energization, valve 54 will be pulled downwardly by valve stem 53 against the resistance of spring 56, and valve opening 55 will be opened to provide communication between air duct 40 and air chest 41. Compressed air at a suitable pressure, generally but a few pounds per square inch, is carried in air duct 40, and upon the opening of valve 54 this air under pressure passes into the air chest 41 and may escape through the perforations 45 in wall 37, which perforations or openings 45 have been heretofore described.

The adjustable gate members 46 it is not believed require any particular description, but attention is directed to Figure 4 wherein the mounting of these gate members is illustrated showing that they operate against the front wall of hopper 36, and that their lower ends are guided by suitable guide strips 58 which are suitably mounted interiorly of the walls of the hopper in position to confine the gate members 46 against displacement laterally but allow vertical adjustment.

There will next be described the electrical connections and program switches for obtaining the desired sequence of operation of the solenoid valve units 43. In connection with the operation of the program switches, it will be assumed that the device is designed so that the conveyor roll 26 is of such circumferential dimensions that the conveyor is advanced the length of a base unit for each revolution of the conveyor shaft 27. Suitably driven from conveyor shaft 27 by means of a chain 60, or the like, there is provided a program switch shaft 61 from which in turn may be driven a second program switch shaft 62 driven by means of chain or the like 63. For the particular conditions of operation to be described herein, the shafts 27 and 61 will rotate at the same speeds, and shaft 62 will be rotated at one-third of such speed.

The program switch which controls the pattern of granules deposited on the asphalt coating is indicated diagrammatically at 64 as comprising a cylinder provided on its periphery with 15 circumferential slots on which are mounted live or conducting elements 65, and dead or insulating elements 66. At one end of cylinder 64 there is provided a conductive contact for one wire of the electric current supply, which wire is indicated by numeral 67. The detailed construction of this program switch has not been shown, nor will any attempt be made to describe such, since the specific construction is immaterial to the invention hereof and such switches are well known and are available as articles of commerce. It is sufficient to say that in connection with this program switch contact is made from supply wire 67 to the live element 65 of the program switch, so that at a point where the live elements are contacted by a contact brush or the like, the current will flow through wire 67 and through the live contact member 65 to the contacting brush.

Figure 9:
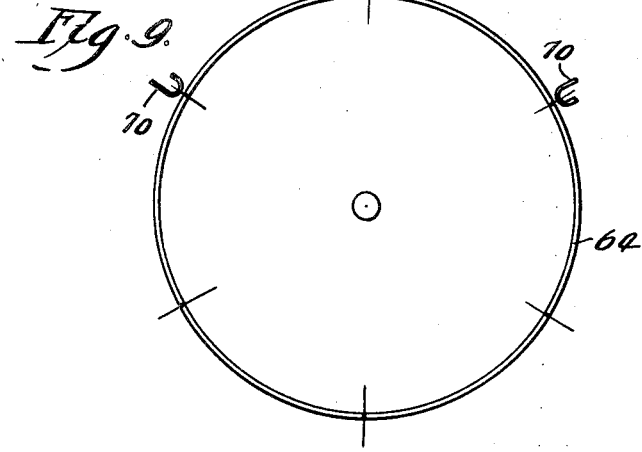
Figure 9 is a diagrammatic showing of the pattern selector.

Suitably mounted with respect to the program switch 64 there are provided a set of contacting brush members 70, which are provided in three different positions, each positioned 60 degrees from the set of brushes 70, which is fully shown in Figure 9. The brush 70 is suitably mounted on a spring 71, with a suitable guide not shown, and is connected with a solenoid 72 whereby, upon energization of the solenoid, the brush 70 may be pulled into contact with the surface of the contact bars provided on the surface of the program switch cylinder. The set of brushes 70 comprises 15 brushes in line mounted over the 15 contact rings on the program switch 64. Conductor wires are provided to connect the like brushes 70 of each set of brushes, that is, at one end the first brush 70 of each of the three sets is connected to each first brush of each of the other sets, and then from this connector a wire 73 leads to a solenoid 43 which operates valve 54. Only one of these wires 73 is shown as actually extending to a solenoid, the other 14 wires being connected to the other 14 of the 15 air valve operating solenoids which are provided in connection with the device, as such has been described. The wires are, however, noted by the letters R, B and R—B as, respectively, being those wires which connect to the sets of red granule hoppers R, the set of buff granule hoppers B and a set of variegated, red and buff granule hoppers R—B.

So that the pattern of variegation may be shifted during the operation of the machine, the second program switch is provided mounted on shaft 62 heretofore referred to. This program switch is shown as having a current pickup ring 75 and three distributing rings, unnumbered but each of which distributor rings is made up of three segments, in connection with which three of the nine segments will be live segments, the other six segments being non-conducting or dead segments. From the distributing brushes 76 of this second or pattern-shifting program switch, three wires which are designated by the letter X lead to and connect to one side of the solenoids 72, which actuate the sets of contact brushes 70 of the pattern program switch.

In connection with the above described electrical system, it is to be noted that reference has been made to only one side of the wiring, that is that side which feeds through the several program switches which have been referred to. For the sake of simplicity, the other side of the wiring is merely shown at various points as grounded to complete the circuit, but it is to be understood that in the actual device, instead of completing the circuit through grounding connections, these connections would be made with suitable conductor wires so as to avoid the probability of short-circuiting and possibly electrocuting the operators.

It will be seen that in the pattern program switch, comprising 15 contact rings, each of six segments provide ninety possible operating contacts for each revolution of the switch cylinder. A siding unit, as such is illustrated, comprises 30 brick units, five rows of six each, so that there are possible three contacts for each brick unit, and thus there is provided a system whereby the valves of each of the three sets of granule hoppers may be actuated for each brick unit. It is to be noted that on the pattern program switch, taken from either end and referring to the three groups of five conductor rings, the second and fourth ring of each group is offset circumferentially 60 degrees with respect to the adjacent rings. This is necessary due to the fact that according to the pattern of the product, the second and fourth rows of bricks are offset one-half brick with respect to the adjacent rows of bricks, and thus it is necessary to make provision for making the valve operating contacts accordingly.

Considering one group of conductor rings of the pattern program switch, for example, the group designated R and operating the set of R or red granule hoppers, it will be seen that if there is one live segment in each of the five conductor rings, since the switch rotates one revolution per base sheet 29, accordingly the valves associated with these hoppers will be opened once per base sheet, traverse, and one deposit of red granules will be made in each row of the pattern. Now if in each of these conductor rings a second live segment is inserted next to the live segments previously referred to, then there will be deposited a red granule pattern in each row next to the one previously applied and, accordingly, as additional segments are inserted in each contact ring an additional red brick will be deposited until, if all six segments in each ring are live segments, the resulting brick siding product is one in which all the brick elements will be red.

If, instead of having the product with all the brick elements red, it is desired to insert, say, one buff brick element, then in the second set of contact rings, that is, the next adjacent five rings, a conducting segment is inserted, and in the other set of conductor rings, the immediately preceding live segment is removed and a non-conducting segment is substituted and it will result that an application of red granules forming one brick pattern will be omitted and in lieu thereof a brick pattern of buff granules will be deposited. This presupposes that the three sets of hoppers are so designed and installed that their nozzle or discharge portions cover a distance equal to one-half a siding unit length, and thus any particular brick area on the blank travels forwardly in synchronism with rotation of the program switch, so that if a deposit of red granules is omitted on a brick area, actuation by the next succeeding but otherwise similarly positioned segment in the buff conductor ring set will cause a deposit of buff granules on this area; or, if variegated granules are to be deposited, the like positioned but second succeeding segment of the third set of rings will be a live segment in order that the valve of the proper variegated granule hopper may be actuated to deposit granules on the area from which the red granules were omitted. From the foregoing, it is believed that it is readily apparent that by further similar substitutions, as have just been described, that is, by the placement of conducting segments in the various conductor rings and appropriate placement of non-conducting segments in the other conductor rings, any desired pattern of the three granule colors may be deposited on each brick siding unit.

In order that in the operation of the apparatus some variation of pattern may be obtained, there is provided the second program switch, heretofore referred to, which is mounted on shaft 62 which functions to shift the overall pattern on any brick siding unit. It will be seen that this second program switch is connected, through actuation of solenoids 72, to bring one of the three sets of contact brushes 70 into contact with the conductor rings of the first or pattern program switch. It will be seen that as the three conductor rings of the second or pattern-shifting switch revolve at one-third the speed of the pattern program switch, each ring comprising three segments, that consequently, by suitable placement of three conducting segments in the pattern-shifting switch, the corresponding three sets of contact brushes 70 will be brought into contact with their corresponding conductor rings. If the central set of brushes 70 are brought into contact, the particular pattern for which the pattern program switch is set will be applied. If the pattern-shifting switch releases this central set of brushes 70 and causes one of the other sets of brushes 70 to make contact, then it will be apparent that the brick pattern will be shifted one brick length ahead or back, depending upon which of the alternative sets of brushes 70 are caused to contact. Or, if the segments in the pattern-shifting switch are appropriately arranged, then the sets of brushes may be actuated successively to provide two successive shifts of the brick pattern, each shift one brick length ahead or behind the previous one, depending upon the order in which the live segments are positioned in the pattern-shifting switch.

One skilled in the art will, of course, understand that instead of employing a pattern-shifting program switch there may be provided a plurality of pattern program switches which may be set up to apply entirely different brick patterns, and that a program switch similar to the pattern-shifting switch may be employed to selectively activate the pattern program switches and thus produce products having various brick patterns in accordance with the activation of the various pattern program switches. It is to be understood also that such like variations in connection with the placement and selection of patterns are contemplated as within the scope of the disclosures hereof.

In the operation of depositing the brick pattern on a base unit 29, the unit is carried forward under the granule hopper nozzles 38, as has been described. Granules in the hoppers 35 feed downwardly along the inclined hopper bottom 37 at a rate controlled by gate 46, so that a controlled amount of granules flow down the inclined hopper bottom 37 against the inclined lip or stop member 39. During inactive periods this flow will reach equilibrium and then stop, and thus a predetermined supply of granules controlled by gate 46 will be maintained in the pocket formed by the juncture of the inclined hopper bottom 37 and stop 39. When a segment of the pattern program switch activates a solenoid 43 of a particular hopper, valve 54 opens providing communication from air duct 40 to air chest 41, and consequently air under pressure is admitted to air chest 41 and such air jets through holes or perforations 45 under the pile of granules which are in the pocket formed by the lower end of hopper bottom 37 and stop 39. These air jets blow the granules from the pocket and over the outer end of stop 39 into nozzle portion 38, and they then fall by gravity to the surface of the board, passing under nozzle 38. As the board moves forward, granules continue to flow through the openings, which are controlled by gate 46, and, as such, come within the influence of the jets issuing through holes 45, they are blown out into the nozzle, and this continues until the pattern program switch segment breaks the contact to the solenoid, thus causing valve 54 to close. The result of the operation just described is to deposit on the surface of the base sheet a strip of granules of the width determined by the space defined by the prolongation of the hopper side walls 50 and 51 and the length of which, as determined by the pattern program switch, is the length of a brick unit. Granules are applied to each of the other brick areas on the base sheet by a like operation of the granule-depositing action of the various granule hopper assemblies, as determined in accordance with the pattern of live segments set up on the pattern program switch. It is to be understood, of course, that more than three different colors of granules may be applied, in which case an additional set of hoppers and associated parts are provided for each color together with an additional set, for each color, of five rings on the pattern program switch.

The invention hereof having been set out in detail, and there having been described the procedure for producing the product having the desired variegated brick pattern surfacing by the application of the principles of the invention, what I claim is:

1. Apparatus applying different particulate materials to preselected different areas of a surface of sheet material and comprising a plurality of walls defining particulate material receiving hoppers, walls extending below and for each hopper defining an enclosed area with the lower edges of the extending walls in substantially a common plane, in each of the hoppers, one of said extending walls comprising the downwardly inclined bottom thereof in each hopper, a gate mounted therein and controlling the flow of material down the inclined hopper bottom, an angularly positioned, generally upwardly inclined wall comprising a prolongation of the inclined hopper bottom, fluid passages adjacent the intersection of the angularly related walls and substantially normal to the inclined hopper bottom wall, a pressure fluid supply connecting to the fluid passages and means controlling the supply of fluid from the fluid supply to the fluid passages whereby when fluid is supplied to the fluid passages, material is jetted from the inclined hopper bottom into the space defined by the walls extending below a hopper.

2. Apparatus comprising an associated plurality of units for feeding particulate material comprising, a downwardly inclined wall, at the lower end thereof an upwardly directed wall forming a material receiving pocket, means supplying a particulate material to the downwardly inclined wall, adjustable means cooperating with the downwardly inclined wall and limiting flow of particulate material down the inclined wall to the material receiving pocket, openings through the inclined wall adjacent the apex of the material receiving pocket and a source of fluid pressure connecting to the said openings, and control means predetermining the sequence of, timing and period of operation of the individual valved control means.

3. The apparatus of claim 2 and including additional control means cyclically shifting the timing of the control means which predetermines the sequence and period of operation of the individual valved control means.

4. Apparatus for applying granule surfacing to a sheet form base and comprising, conveying means, means for applying an adhesive coating to a surface of the sheet form base advanced by the conveying means, means positioned over the path of the conveyed sheet form base segregating groups of differing sheet surfacing materials, pressure fluid discharge means operatively associated with each surfacing material segregating means, valve means for controlling each fluid discharge means, valve controlling means synchronized with the conveying means for sequentially operating the valved means and selectively jetting preselected groups of said groups of surfacing materials from the respective means for segregation thereof, and means for directing the so jetted groups of surfacing materials to the surface of the sheet form base advancing in its conveyed path.

5. The method of applying a predetermined variegated pattern of surfacing granules to the surface of a sheet material and comprising the steps; advancing the sheet material in a predetermined path, providing individualized batches of differing granular materials at predetermined intervals above and along the path of the sheet material and impacting and projecting the individualized batches of granular materials with fluid jets discharging the granular material into space and providing for the deposit thereof upon the sheet material under the influence of gravity.

6. In an apparatus for applying granule surfacing to a sheet form base, a conveyor, means applying an adhesive coating to a surface of sheet material on the conveyor and in combination therewith, means depositing granules on the adhesive coating and comprising a granule receiving pocket adjacent the sheet material, a pressure fluid conduit associated with the granule pocket for supplying pressure fluid to the pocket, valve means for controlling the discharge of pressure fluid from the conduit to the pocket, and means synchronized with the conveyor for operating the valve at and for predetermined limited intervals to periodically jet groups of granules from the pocket.

7. Apparatus for applying granule surfacing to a sheet form base and comprising a conveyor, means applying an adhesive coating to a surface of sheet material advancing in a controlled path, means for individualizing groups of granules, fluid jetting means for projecting individualized groups of granules into the air above the sheet form base for deposit on the adhesive coating, and means for supplying pressure fluid to said jetting means at predetermined intervals and in blasts.

8. The method of applying a predetermined variegated pattern of surfacing granules to a sheet of material advancing in a substantially horizontal position and comprising the steps; segregating groups of different granules adjacent and above the sheet in synchronism with the travel of the sheet and in predetermined sequence, at predetermined intervals and for predetermined periods impacting preselected groups of segregated granules with fluid jets selectively projecting the segregated groups of granules from the respective sites of segregation into space whereby under the influence of gravity the segregated groups of granules are deposited in a pattern of groups on the sheet material.

CARL G. MUENCH.

REFERENCES CITED

The following references are of record in the file of this patent:

UNITED STATES PATENTS

| Number | Name | Date |
|---|---|---|
| 1,456,224 | Currier | May 22, 1923 |
| 1,977,321 | Merritt et al. | Oct. 16, 1934 |
| 2,011,006 | Maclean | Aug. 13, 1935 |
| 2,163,757 | Maclean et al. | June 27, 1939 |
| 2,434,736 | Dryer | Jan. 20, 1948 |